United States Patent
Franklin (10) Patent No.: US 8,381,033 B2
(45) Date of Patent: Feb. 19, 2013

(54) FAULT MANAGEMENT IN VIRTUAL COMPUTING ENVIRONMENTS

(75) Inventor: David Richard Franklin, London (GB)

(73) Assignee: International Business Machines Corporation, Armonk, NY (US)

( * ) Notice: Subject to any disclaimer, the term of this patent is extended or adjusted under 35 U.S.C. 154(b) by 178 days.

(21) Appl. No.: 12/777,375

(22) Filed: May 11, 2010

(65) Prior Publication Data
US 2011/0107148 A1 May 5, 2011

(30) Foreign Application Priority Data
Oct. 30, 2009 (EP) ..................................... 09174602

(51) Int. Cl.
*G06F 11/30* (2006.01)
*G06F 11/00* (2006.01)

(52) U.S. Cl. ............. 714/26; 714/25; 714/38.1; 714/39; 714/47.1

(58) Field of Classification Search .................... 714/13, 714/25, 26, 33, 37, 38.1, 39, 47.1, 48; 709/224; 370/241, 242
See application file for complete search history.

(56) References Cited

U.S. PATENT DOCUMENTS

| | | | | |
|---|---|---|---|---|
| 8,031,634 | B1 * | 10/2011 | Artzi et al. ..................... | 370/254 |
| 2004/0049565 | A1 | 3/2004 | Keller | |
| 2004/0205413 | A1 | 10/2004 | Arbeitman | |
| 2008/0109683 | A1 * | 5/2008 | Erwin et al. .................... | 714/25 |
| 2009/0028053 | A1 | 1/2009 | Kannan et al. | |
| 2010/0192013 | A1 * | 7/2010 | Krishnan et al. ................ | 714/26 |

OTHER PUBLICATIONS

International Search Report and Written Opinion for PCT Application PCT/EP2010/062761, mailed Oct. 4, 2010, 9 pages.
Duchamp et al., "A Hypervisor Based Security Testbed," Stevens Institute of Technology, Proceedings of the DETER Community Workshop on Cyber Security Experimentation and Test, Jul. 2007, 6 pages.
Office Action for German patent application 11 2010 0004 182.2, filed Aug. 31, 2010, German Patent and Trademark Office, mailed Jun. 26, 2012, 9 pages (German), 8 pages (English).
Veith et al., "Just-in-time relocation thanks to hardware monitoring is possible: Test: Stratus uses virtualization for failover solution," publisher: Stratus, Mar. 2010, 4 pages (German), 5 pages (English).

* cited by examiner

*Primary Examiner* — Joseph D Manoskey
(74) *Attorney, Agent, or Firm* — Van Leeuwen & Van Leeuwen; John D. Flynn (57) ABSTRACT

A method and system for fault management in virtual computing environments are provided. The system includes: a monitor of fault events from virtual machines and host devices in a virtual computing environment and a monitor of situation events in the virtual computing environment wherein the situation events refer to a virtual machine name and a host device name. A universal faults component determines if a fault event affects both virtual machines and host devices and a correlating component correlates fault events relating to virtual machines and host devices as relating to the same problem. Host machine fault events correlated to a problem are marked as a root event and virtual machine fault events correlated to a problem are marked as symptoms with a link to the root event.

25 Claims, 5 Drawing Sheets

FAULT MANAGEMENT IN VIRTUAL COMPUTING ENVIRONMENTS

RELATED APPLICATIONS

This application is based on and claims the benefit of priority from European Patent Application EP 09174602.4, filed Oct. 30, 2009.

BACKGROUND

This invention relates to the field of fault management. In particular, the invention relates to fault management in virtual computing environments.

It is common to run operating systems in virtual environments. These in turn are used to run applications that implement a range of services. Each Virtual Machine (VM) directly replicates a physical computer but is run under a hypervisor on a physical host machine. A host machine can host several VMs. To maximise host machine utilization and increase fault tolerance, VMs are often run on a cluster of host machines. If one host machine fails then the VMs can be moved (or migrated) to run on another host machine in the cluster.

Faults may occur on VMs in a similar way to how they occur on physical machines. Fault management systems can be used to detect and monitor these problems and report them to an operator allowing rapid resolution. For example, IBM Netcool is a service level management system that collects enterprise-wide event information from many different network data sources including fault events (IBM and Netcool are trade marks of International Business Machines Corporation).

In a virtual environment, faults may be caused by faults on the host hypervisor system that is running the VM. If many VMs are being run by a single host this can potentially result in a flood of faults being reported that are not caused by faults on the VMs themselves. This can be confusing and time consuming for an operator to work through and fix quickly. Furthermore, even if hypervisor fault monitoring is also implemented this (often less severe) root cause fault can be lost in the flood of VM fault events and overlooked by the operator.

In addition, one way of resolving some faults on VMs is to move them to a different physical host machine. This will result in an instant resolution of some problems but traditional fault monitoring systems running on these VMs can be slow to update this change in status and clear the problem.

BRIEF SUMMARY

According to one embodiment of the present invention there is provided a method for fault management in virtual computing environments, including monitoring fault events from virtual machines and host devices in a virtual computing environment, monitoring situation events in the virtual computing environment where the situation events refer to a virtual machine name and a host device name, determining if a fault event affects both virtual machines and host devices, and correlating fault events relating to virtual machines and host devices as relating to the same problem.

In an embodiment, the method may include maintaining a virtual machine status table, and maintaining a mapping of virtual machine names and host device names.

In another embodiment, the method may also include inserting fault events into a table of fault events. Host machine fault events correlated to a problem may be marked as a root event in the table of fault events. Virtual machine fault events correlated to a problem may be marked as symptoms in the table of fault events and a link to the root event added in the table of fault events.

In another embodiment, when a virtual machine is moved to a new host machine, fault events for the virtual machine may be located in the table of fault events and reduced in severity. In addition, a root link may be removed.

In another embodiment, the situation events may be monitored by a monitoring system from which a probe feeds event alerts and include an indication of relations between a virtual machine and a host device and host fault events.

In another embodiment, the fault events in the virtual machines may be fed by probes running on the virtual machines and the fault events in the host machines may be fed by probes running on the host machines.

In another embodiment, the fault events in the host machines may be monitored by a monitoring system from which a probe feeds event alerts.

According to another embodiment of the present invention there is provided a computer software product for fault management in virtual computing environments, the product including a computer-readable storage medium, storing a computer in which program comprising computer-executable instructions are stored, which instructions, when read executed by a computer, monitor fault events from virtual machines and host devices in a virtual computing environment, monitor situation events in the virtual computing environment where the situation events refer to a virtual machine name and a host device name, determine if a fault event affects both virtual machines and host devices, and correlate fault events relating to virtual machines and host devices as relating to the same problem.

According to another embodiment of the present invention there is provided a system for fault management in virtual computing environments, including a processor, a monitor of fault events from virtual machines and host devices in a virtual computing environment, a monitor of situation events in the virtual computing environment where the situation events refer to a virtual machine name and a host device name, a normalising component for determining if a fault event affects both virtual machines and host devices, and a correlating component for correlating fault events relating to virtual machines and host devices as relating to the same problem.

In an embodiment, the system may include a virtual machine status table and a mapping of virtual machine names and host device names.

In another embodiment, the system may further include a table of fault events for maintaining a list of fault events relating to virtual machines or host devices. The system may include a root event marker in the table of fault events for host machine fault events correlated to a problem. The system may also include a symptom marker in the table of fault events for virtual machine fault events correlated to a problem and a link to the root event in the table of fault events.

In another embodiment, the system may include a fault resolution component where when a virtual machine is moved to a new host machine, the resolution component locates fault events for the virtual machine in the table of fault events and reduces the events in severity.

In another embodiment, the monitor for situation events may obtain the situation events from a virtual environment cluster control centre and may feed event alerts to the fault management system.

In another embodiment, the monitor for fault events may be probes running on the virtual machines and the monitor for fault events may be probes running on the host machines.

In another embodiment, the monitor for fault events in the host machines may obtain the fault events from a virtual environment cluster control centre and may feed event alerts to the fault management system.

In another embodiment, the probes may run on a remote machine and may monitor the host machine via a network.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

DETAILED DESCRIPTION

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

A method and system are described in which fault events are gathered from both a hypervisor and the VMs and are normalised and fed into a fault management system. Data is also gathered from the hypervisor indicating which host machine each VM is running on. This information is used to perform the following actions.

1. Fault event correlation. Fault events produced by the host machine or the hypervisor (referred to as host events) and the virtual machine (referred to as VM events) which relate to the same original problem are identified. The host event that is causing the errors on the VMs is increased in severity and marked as a root cause. The corresponding errors from the VMs are reduced in severity, marked as symptom events and a field in the event is set to point to the root cause event. This allows the operator to filter out the symptom events and identify the high severity root cause event much more quickly. The problem can be more rapidly resolved, which in turn will resolve the symptom VM events. If the operator is looking at a particular symptom event then the root cause can also be rapidly identified.

2. Fault resolution after VM migration. Hardware related faults can be resolved by moving the virtual machine to a new physical host machine. When a VM is migrated to a new physical host then this class of faults are reduced in severity.

Once the monitors on the VM receive the information that the fault has been cleared then the VM events will be resolved and cleared as normal. The advantage of doing this is that the operator's display of high severity fault events will be cleared far more rapidly allowing them to concentrate on any more important problems.

Figure 1:
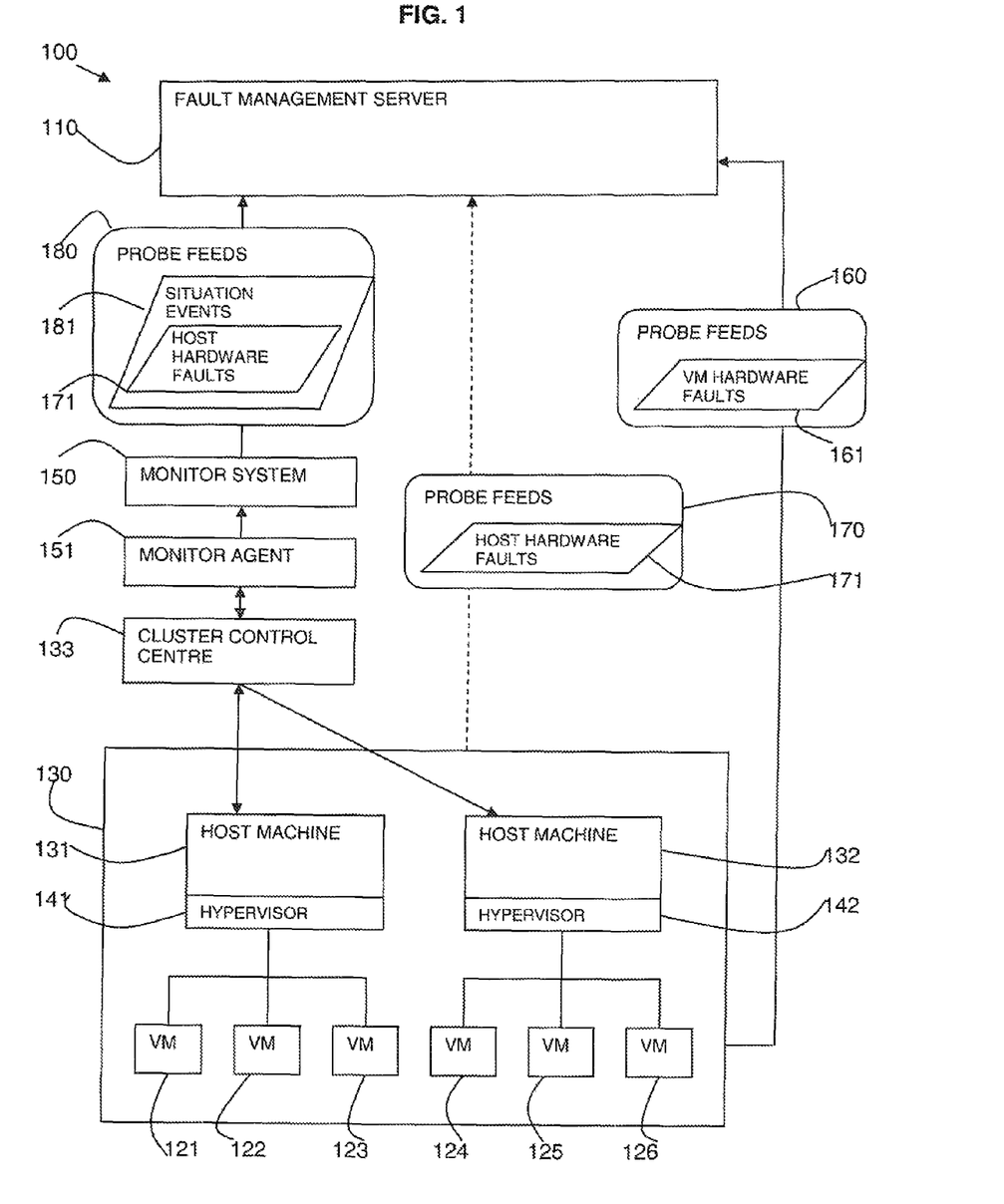
FIG. 1 is a block diagram of a system in accordance with an embodiment of the present invention.

Referring to FIG. 1, a system 100 is provided including a fault management server 110 for handling fault events in a virtual computing environment.

The virtual computing environment includes one or more virtual machines 121-126, each of which runs on a host machine operating system 131, 132 or computer hardware which has a layer of software which is a virtual machine monitor or hypervisor 141, 142 that allocates hardware resources dynamically and transparently. Multiple operating systems can run concurrently on a single physical computer and share hardware resources with each other. By encapsulating a machine, including central processor, memory, operating system, and network devices, a virtual machine 121-126 is compatible with standard operating systems, applications, and device drivers.

To maximise host machine utilization and increase fault tolerance, VMs 121-126 are run on a cluster 130 of host machines 131, 132. If one host machine 131, 132 fails then the VMs can be moved (or migrated) to run on another host machine 131, 132 in the cluster 130.

The VMs 121-126 run probes to provide probe feeds 160 to report VM faults 161 caused by underlying hardware failure or problems (referred to as VM hardware faults) to the fault management server 110. The host machines 131, 132 may also run probes (if these are supported by the host machines) to provide probe feeds 170 to report host hardware faults 171 to the fault management server 110.

The term probes is used for programs which connect to an event source such as the VM or host machine and detect and acquire event data and forward the event data to the fault management server 110 as alerts. Probes may use the logic specified in a rules file to manipulate the event elements before converting them into the fields of an alert in the fault management server 110 alerts status table. Each probe may be designed to acquire event data from a specific source. Probes may also be referred to as monitoring devices or agents for remotely or directly monitoring network devices.

For example, VMs 121-126 and host machines 131, 132 may run standard OMNIbus probes 160 if they are Linux based or run on OMNIbus supported platforms (OMNIbus is a trade mark of International Business Machines Corporation and Linux is a trade mark of Linus Torvalds).

In an alternative embodiment, the probes may be run on a remote machine and monitor the hypervisor machine 131, 132 via a network protocol or remote mount.

A cluster 130 is controlled via a control centre 133 and will migrate VMs 121-126 between the host machines 131, 132 as required. The control centre 133 can be run on a VM 121-126 on the cluster 130.

A monitor system 150 is provided, which has an agent 151 which talks to the control centre 133 via an API and reports situation events 181 to the monitor system 150. A probe or monitor is used to feed 180 these events to the fault management server 110. Situation events 181 keep track of which VM 121-126 is on which host machine 131, 132 and also report host faults 171.

In an alternative embodiment, the agent 151 could optionally connect to the hypervisors 141, 142 directly instead of through the control centre 133 but this is less robust if an entire host machine 131, 132 were to fail.

Host hardware faults 171 on the hosts 131, 132 are reported in the situation events 181 via the control centre 133 to the monitor system 150 and then to the fault management server 110 via the probe feeds 180 used to report the situation events 181.

Additionally, if the host machines 131, 132 support probes, host hardware faults 171 may be fed direct to the fault management system 110. If the hardware faults 171 can be fed 170 via probes directly to the fault management system (the option shown in broken lines in FIG. 1), the probes can be used to gather a richer set of potential errors direct from the host machines 131, 132.

One common and widely used hypervisor in an industrial high availability environment is VMware ESX (VMware and ESX are trade marks of VMware, Inc.). In an example embodiment, using VMware ESX hypervisor clusters, a monitor system may be used in the form of IBM Trivoli Monitor (ITM) (Trivoli is a trade mark of International Business Machines Corporation) with an agent for VMware for virtual infrastructure (VMware VI agent). The fault management server may the object server of IBM's Netcool/OMNIbus system using Event Integration Facility (EIF) probes to feed events from the VMware VI agent.

In one embodiment, the hardware faults of the VMs are reported using OMNIbus probes. The VMware ESX hypervisors are Linux based and therefore may run standard OMNIbus probes. The hardware faults on the hosts are also reported via the ESX control centre to ITM and then to the ObjectServer via the EIF probe.

Other hypervisors may be used including IBM hHype (hHype is a trade mark of International Business Machines Corporation), Microsoft HyperV (Microsoft and HyperV are trade marks of Microsoft Corporation), Kernal-based Virtual Machine on Linux, z/VM (z/VM is a trade mark of International Business Machines Corporation), and others.

The monitor agent 151 connects to the control centre 133 via its SDK API and can produce, for example, the following situation events 181. Each situation is raised when it occurs and is cleared when it no longer applies.

Availability
The status of the host machine server is unreachable.
CPU
The vmkernel is not loaded
The CPU utilization is very high.
The CPU utilization is low.
The CPU is overloaded.
Disk
The filesystem is almost full.
The disk read activity is high.
The disk write activity is high.
Memory
Amount of available free memory for the console OS (COS) is low.
Amount of available free memory for the host machine sever is low.
Network
The network transmit activity is high.
The network receive activity is high.
Virtual Machines
The virtual machine is powered off
The virtual machine is in a stuck state.
The virtual machine is in an unknown state.
The virtual machine is in a suspended state.

With the exception of "The status of the host machine server is unreachable" each of these situations has a VM server name and a VM name attribute. This corresponds to the hardware server name and the name of the VM configured in the control centre software. This would normally correspond to the host name of the virtual machine.

Figure 2:
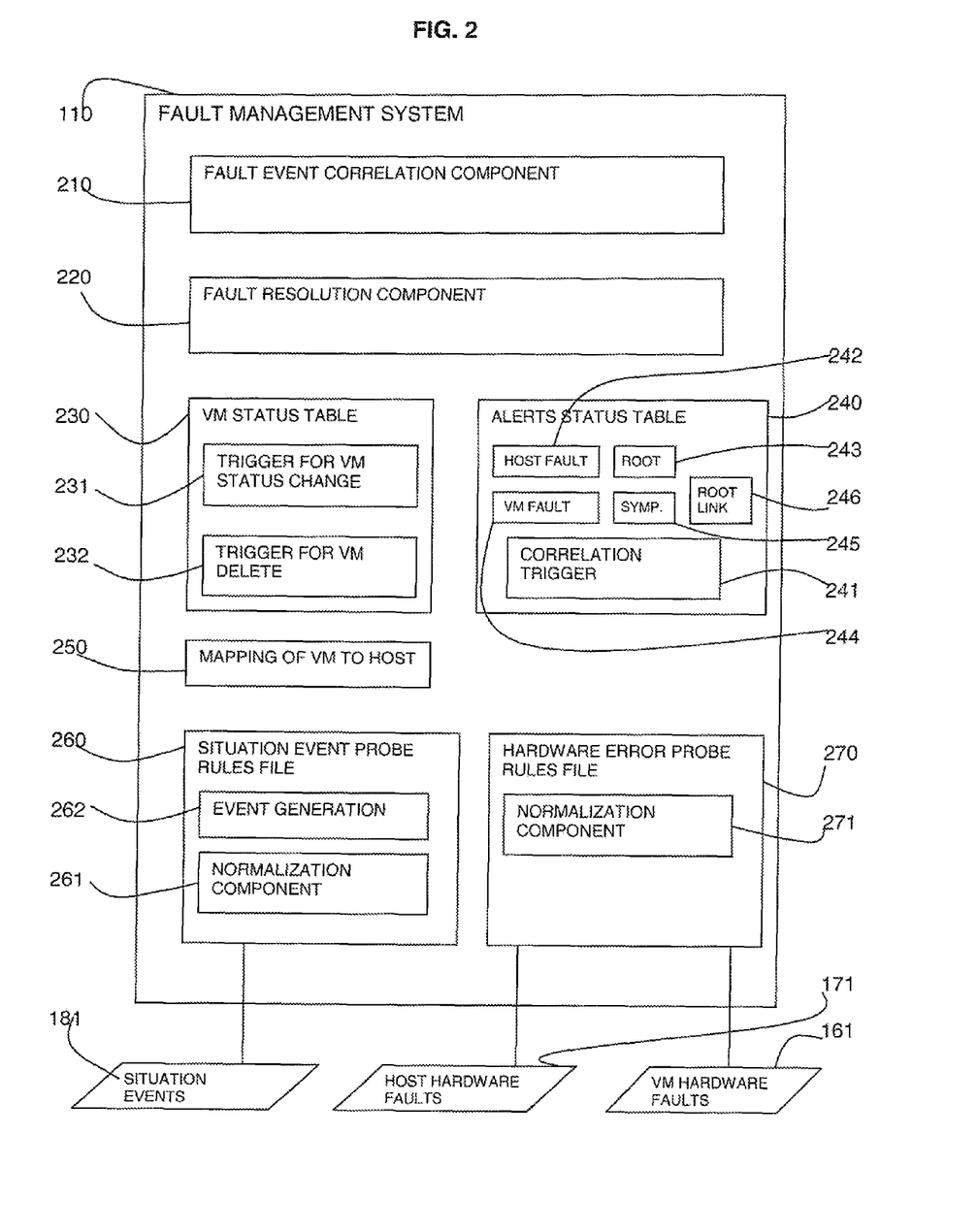
FIG. 2 is a block diagram of an object server of a system in accordance with an embodiment of the present invention.

Referring to FIG. 2, a block diagram shows a fault management server 110. The fault management server 110 includes a fault event correlation component 210 and a fault resolution component 220. In addition, the fault management server 110 includes a VM status table 230 and a table of fault events referred to as an alerts status table 240 for hardware faults.

The fault event correlation component 210 identifies fault events produced by the host or hypervisor and the virtual machine which relate to the same original problem. The host event that is causing the errors on the VMs is increased in severity and marked as a root cause. The corresponding errors from the VMs are reduced in severity, marked as symptom events and a field in the event is set to point to the root cause event.

The fault resolution component 220 resolves faults after VM migration. Hardware related faults may be resolved by moving the virtual machine to a new physical host machine. When a VM is migrated to a new physical host then this class of faults are reduced in severity. Once the monitors on the VM receive the information that the fault has been cleared then the VM events will be resolved and cleared as normal.

The VM status table 230 includes the VMs host names and VM server host names and the VM status.

An example embodiment of the status table 230 of the fault management server 110 contains four columns.

| Table: custom.vmstatus | | | Type: Persistent | |
|---|---|---|---|---|
| Column Name | Type | Size | Primary Key | Comment |
| VMHostName | varchar | 64 | yes | |
| ESXHostName | varchar | 64 | no | |
| VMStatus | Int | | | 0 = offline, 1 = active |
| StateChange | Time | | | Last time the entry was modified |

For situation events listed above (apart from "the status of the host machine is unreachable"), the probe feed will send the VM server name and the VM name attributes to the VM status table 230 of the fault management server 110.

A first trigger 231 is associated with the VM status table to update the VM status from probe feeds. The first trigger 231 of the VM status table 230 takes no action if the data in the table remains unchanged. For example, if "the virtual machine is powered off", "the virtual machine is in a stuck state", or "the virtual machine is in a suspended state", become true then the active column value will be 0 otherwise it will be 1.

In another embodiment, procedures may be called. For example, if the host associated with a virtual machine changes then a VM_Host_Change procedure will be called. If the state of a VM entry changes from active to in-active then a VM_Down procedure will be called. If the state of a VM entry changes from in-active to active then a VM_Restored procedure will be called. The configuration files may use signals that invoke another set of triggers to perform these actions rather than procedures.

The VM status table 230 includes a second temporal trigger 232 associated with to delete a VM status entry. This clears out unused entries from the status table 230 and may run, for example, once a day. Each status entry is checked and if there is no change for a given time period (for example, two weeks) then the entry is deleted. The purpose of this trigger is to prevent the VM status table from growing if temporary virtual images are being created and destroyed on a regular basis.

The status of the VM is kept up to date by the situation events 181 from the monitor agent.

Information is duplicated as different situations may provide the same information for the VM status table 230. This is done to provide an additional degree of fault tolerance in the unlikely occurrence that a situation event is missed.

The monitoring of a cluster (VMware agent, EIF probe and ObjectServer) may be running before any VMs are started. This ensures that the VM status table 230 is populated correctly. If VMs are already running on the cluster when the monitoring is started then they should be suspended and resumed in order to populate the VM status table 230 or VMotioned to another host if uninterrupted service is required.

A probe rules file 260 includes a normalizing component 261 which performs a mapping of the situation events into a normalized format consistent with similar error events produced by other probes and can be used to insert error events and resolutions for the error situations described above. An event generation component 262 will be used in the rules file 260 to insert events into alerts status table 240 as well as the VM status table 230.

The fault event correlation component 210 correlates hardware error events between the virtual machines and the hypervisor. These hardware errors 161, 171 are gathered by probes running on the VMs and by probes or agents running on or communicating with the hypervisor and/or the host machines.

For the example configuration for VMWare then fault events will be gathered remotely via the ITM VI VMware agent.

Some groups of hardware faults 161, 171 will affect both the hypervisor and the VMs running on it. Typical examples are high CPU use, memory failure, or shared device failure. These will be classified and normalized by a normalizing component 271 which identifies universal faults within the probe rules file 270. For ITM VMware events this will be done in the EIF probe rules file 260.

Once the error events have been inserted into alerts status table 240 they will be correlated using a temporal correlation trigger 241 that will run at regular intervals, for example, every 20 seconds.

Once host and VM events have been correlated then they may be modified to indicate this relationship. In one embodiment, the VM events 242 will be marked as "Symptom" events 243 and the host events 244 will be marked as "Root" events 245. The Symptom events will then point to the Root events.

If a VM fails completely then it can also be the root cause of many more error events.

In the embodiment using procedures, the VM_Down and VM_Restored procedures may be used to introduce Root links for these types of error. For example, a probe running on a VM may fail and produce an error because a heartbeat is no longer received. The details and summary for the error will be updated by the VM_Down procedure and the VM_Restored procedure will again update this information and reduce the severity of the error event and/or introduce a Root link. However, in this embodiment, the error will only be cleared when the probe is running again.

The fault resolution component 220 resolves hardware error events. When a VM is migrated then it will update the VM status table 230. This procedure will perform a scan of hardware error events associated with the VM hostname and will reduce their severity in order to indicate that they are no longer a significant problem. If a Root link was introduced to a physical host event then this will be removed.

These hardware error events will be a superset to the situation events. The error events that affect both the hypervisor and the VM are reduced in severity and will have some form of Root link that will need removing. There may also be uncorrelated events that will need their severity reducing. Finally, some hardware error events will not be resolved by migrating the VM such as low disk space and so will be left unchanged.

The proposed solution may use a VM hostname to hypervisor hostname mapping table 250. This table 250 will be searched within several triggers. The primary key will be the VM hostname and this will be used to search the table and an efficient hash table lookup will be used by the fault management server. The highest processing overhead will be for the VM to physical host correlation trigger 241. This should keep the number of traversals of alerts status table 240 to a minimum. However, if a hypervisor host goes down then a potentially large number of VMs could be migrated to different hosts.

Similarly, if a hardware error occurs on a hypervisor running many VMs then a potentially large number of hardware error events could be received from the VMs.

Figure 3:
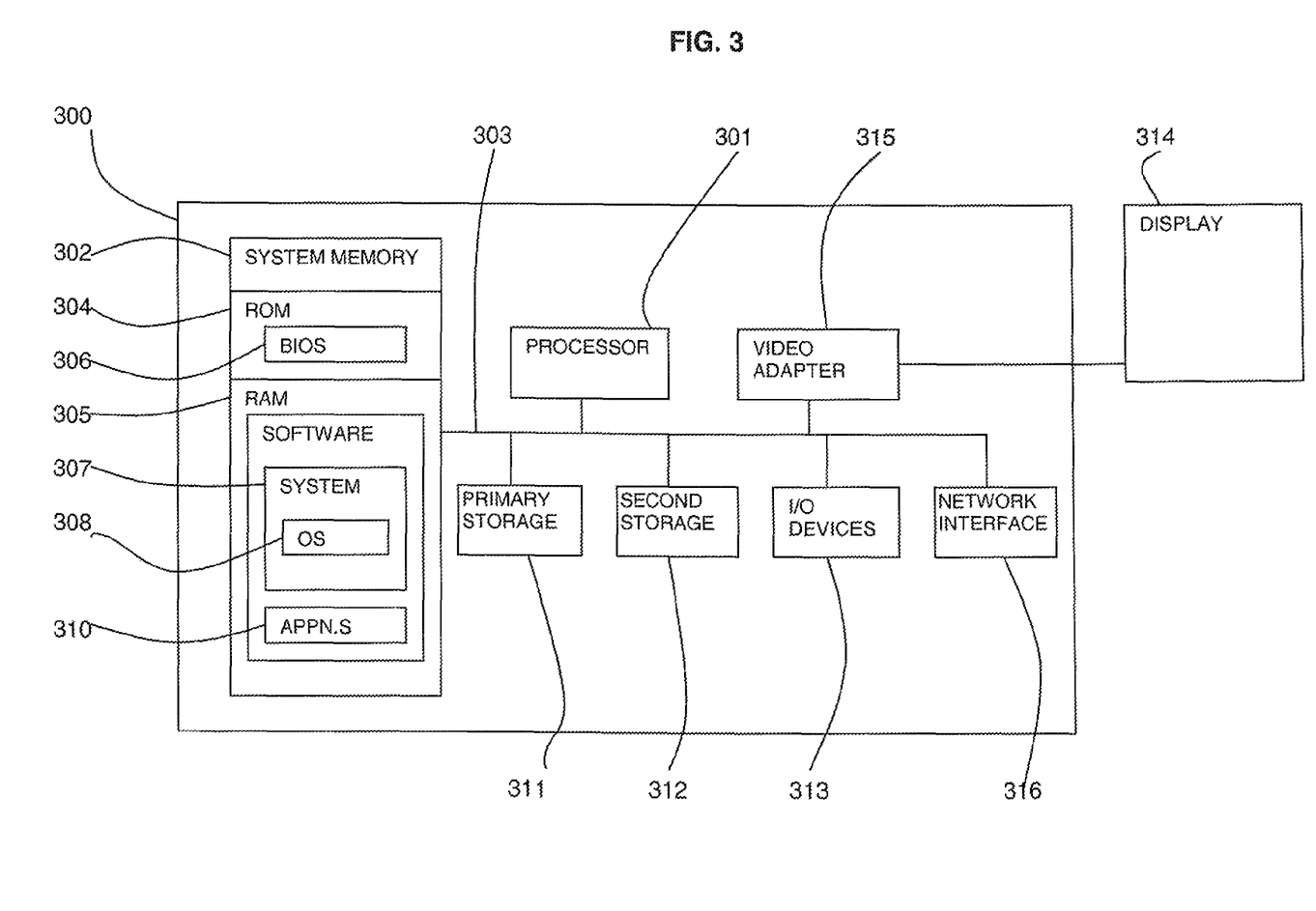
FIG. 3 is a block diagram of a computer system in which the present invention may be implemented.

Referring to FIG. 3, an exemplary system for implementing aspects of the invention includes a data processing system 300 suitable for storing and/or executing program code including at least one processor 301 coupled directly or indirectly to memory elements through a bus system 303. The memory elements can include local memory employed during actual execution of the program code, bulk storage, and cache memories which provide temporary storage of at least some program code in order to reduce the number of times code must be retrieved from bulk storage during execution.

The memory elements may include system memory 302 in the form of read only memory (ROM) 304 and random access memory (RAM) 305. A basic input/output system (BIOS) 306 may be stored in ROM 304. System software 307 may be stored in RAM 305 including operating system software 308. Software applications 310 may also be stored in RAM 305.

The system 300 may also include a primary storage means 311 such as a magnetic hard disk drive and secondary storage means 312 such as a magnetic disc drive and an optical disc drive. The drives and their associated computer-readable media provide non-volatile storage of computer-executable instructions, data structures, program modules and other data for the system 300. Software applications may be stored on the primary and secondary storage means 311, 312 as well as the system memory 302.

The computing system 300 may operate in a networked environment using logical connections to one or more remote computers via a network adapter 316.

Input/output devices 313 can be coupled to the system either directly or through intervening I/O controllers. A user may enter commands and information into the system 300 through input devices such as a keyboard, pointing device, or other input devices (for example, microphone, joy stick, game pad, satellite dish, scanner, or the like). Output devices may include speakers, printers, etc. A display device 314 is also connected to system bus 303 via an interface, such as video adapter 315.

Figure 4:
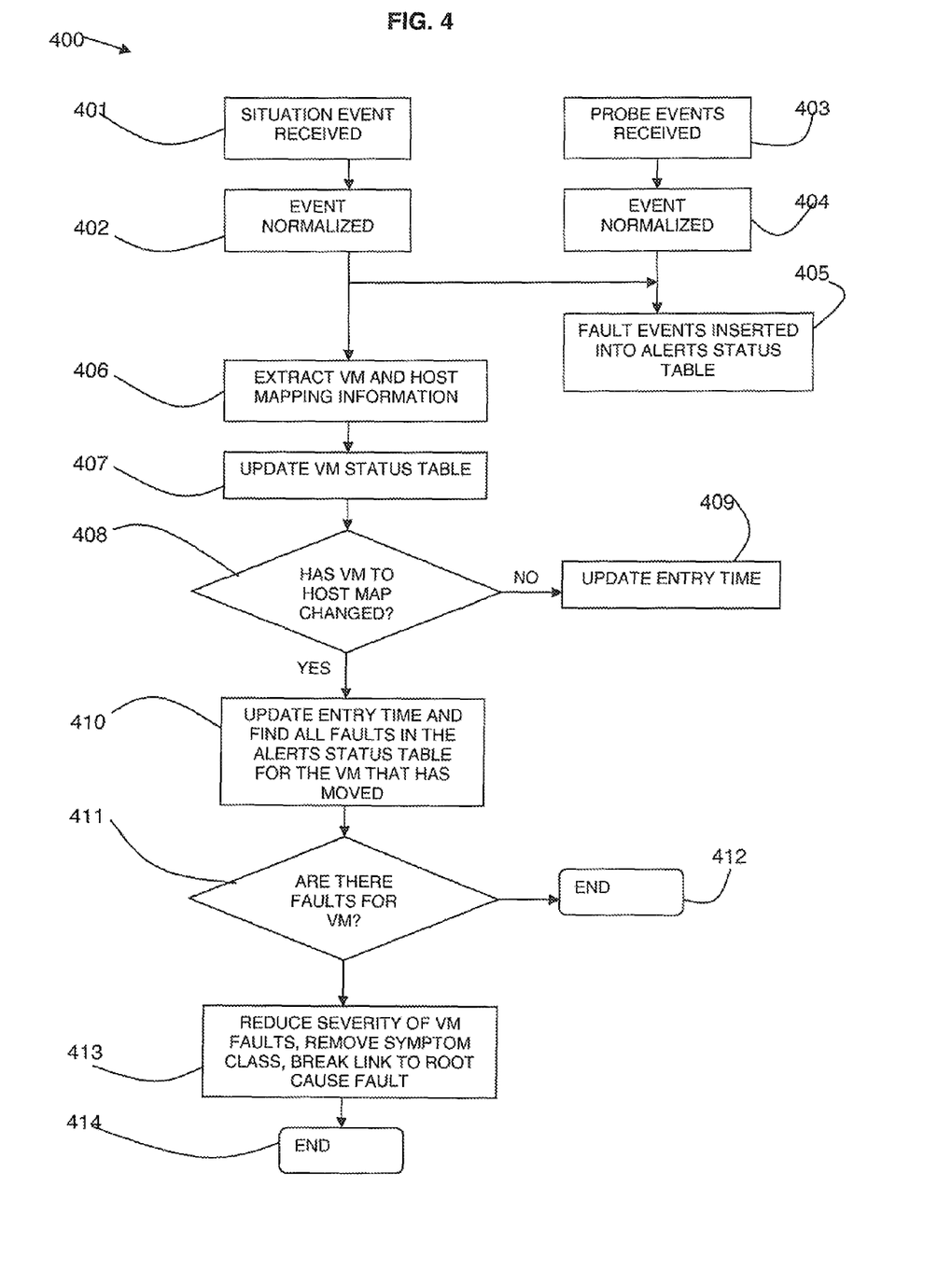
FIG. 4 is a flow diagram of a method in accordance with an embodiment of the present invention.

Referring to FIG. 4, a flow diagram 400 shows a method according to an embodiment of the present invention. Situation events are received 401 and normalized 402. In parallel, VM probe events are received 403 (and additionally host probe events if these are also supported) and normalized 404. The normalized events are inserted 405 as fault events into the alerts status table.

VM and host mapping information is extracted 406 from the situation events and the VM status table is updated 407.

It is determined 408 if the VM to host mapping has changed. If it has not changed, the entry time is simply updated 409. If it has changed, the entry time is updated and hardware faults in the alerts status table are found 410 for the VM that has moved.

It is then determined 411 if there are any suitable hardware faults for the VM. If not, the method ends 412. If there are, the severity of the VM faults is reduced 413 and a symptom classification is removed, if it exists. The link to the host root cause fault is broken, if it exists. The method then ends 414.

Figure 5:
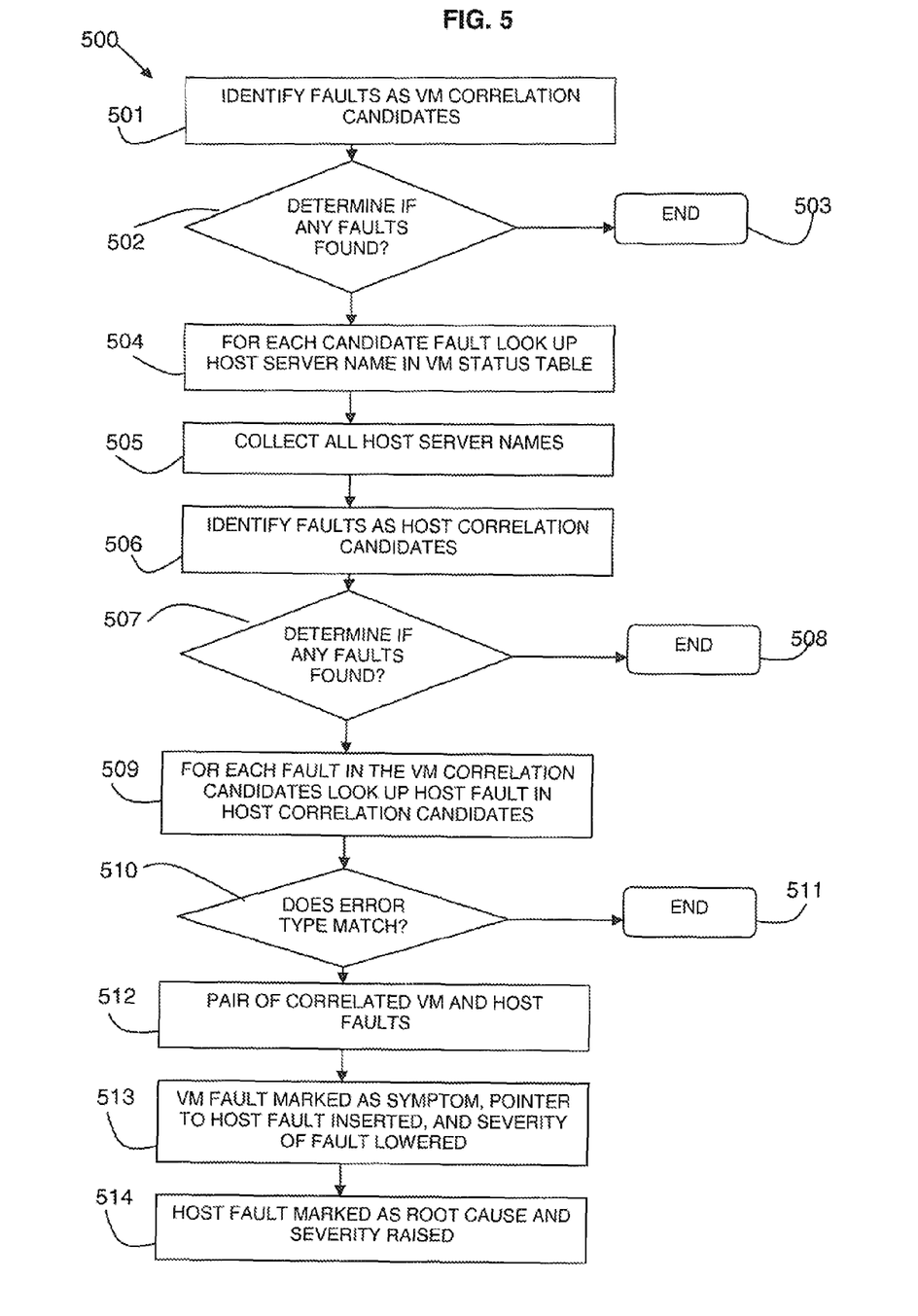
FIG. 5 is a flow diagram of a method in accordance with an embodiment of the present invention.

Referring to FIG. 5, a flow diagram 500 shows a method of correlation of faults which is run at regular intervals in accordance with an embodiment of the present invention.

Firstly, faults are identified 501 which are VM correlation candidates. This is by finding the faults in the alerts status table that meet the following points:
they have not been classified as root cause or symptoms,
they have not already been resolved,
they have a hostname that matches one of the VM hostnames in the VM status table, and
they are of a type that could be caused by a host problem.

It is determined 502 if any suitable faults are found. If there are none, the method ends 503. If there are such faults, for each fault in the VM correlation candidates, look up 504 the host server name in the VM status table. Collect together 505 all the host server names as the set of host server names.

Next, faults are identified 506 which are host correlation candidates. This is by finding the faults in the alerts status table that meet the following points:
they have not been classified as symptoms,
they have not already been resolved,
they have a host name in the set of host server names in step 505, and
they are of a type that could cause a host problem.

It is determined 507 if any suitable faults are found. If there are none, the method ends 508. If there are such faults, for each fault in the VM correlation candidates look up 509 the host fault in the host correlation candidates.

It is determined 510 if the error type matches. If not, the method ends 511. If it does match there is a pair of correlated VM and host faults 512.

The VM fault is marked 513 as a symptom, the "local root object" field is pointed to the host fault, and the severity of the fault is lowered. The host fault is marked 514 as a root cause and its severity raised.

It should be noted that more than one VM fault can point to a single host root cause fault.

A fault management system may be provided as a service to a customer over a network.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device. For the purposes of this description, a computer readable storage medium can be any apparatus that can contain or store the program for use by or in connection with the instruction execution system, apparatus or device. However, a computer readable storage medium is not a transitory or propagation medium.

The computer readable storage medium can be an electronic, magnetic, optical, electromagnetic, infrared, or semiconductor system (or apparatus or device). Examples of a computer-readable storage medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

The invention claimed is:

1. A method for fault management in virtual computing environments, comprising:
monitoring a plurality of fault events from a plurality of virtual machines and a plurality of host devices in a virtual computing environment;
monitoring a plurality of situation events in the virtual computing environment, wherein each of the situation events corresponds to a virtual machine name and a host device name, wherein the situation events are monitored by a monitoring system from which a probe feeds one or more event alerts, and wherein the situation events include an indication of one or more relations between one or more of the virtual machines, one or more of the host devices, and one or more of the host fault events;
in response to monitoring the fault events and monitoring the situation events, identifying one or more selected fault events from the plurality of fault events, wherein the selected fault events affect both one or more of the virtual machines and one or more of the host devices; and
in response to the identifying, correlating one or more of the selected fault events as relating to a same problem.

2. The method as claimed in claim 1, further comprising:
maintaining a virtual machine status table; and
maintaining a mapping of virtual machine names and host device names.

3. The method as claimed in claim 1, further comprising:
inserting the plurality of fault events into a table of fault events.

4. The method as claimed in claim 3, wherein one or more host machine fault events correlated to the same problem are marked as a root event in the table of fault events.

5. The method as claimed in claim 4, wherein one or more virtual machine fault events correlated to the same problem are marked as symptoms in the table of fault events and a link to the root event is added in the table of fault events.

6. The method as claimed in claim 5, further comprising:
moving a selected virtual machine to a new host machine;
in response to the moving, locating one or more fault events for the virtual machine in the table of fault events; and
in response to the locating, reducing a severity for the located fault events.

7. The method as claimed in claim 6, further comprising removing a root link for the located fault events.

8. The method as claimed in claim 1, wherein the fault events in the virtual machines are fed by probes running on the virtual machines.

9. The method as claimed in claim 1, wherein the fault events in the host machines are fed by probes running on the host machines.

10. A computer software product for fault management in virtual computing environments, the product comprising a computer-readable storage medium, the computer-readable storage medium storing a computer program comprising computer-executable instructions, which instructions, when executed by a computer, perform the following:
   monitor a plurality of fault events from a plurality of virtual machines and a plurality of host devices in a virtual computing environment;
   monitor a plurality of situation events in the virtual computing environment, wherein each of the situation events corresponds to a virtual machine name and a host device name, wherein the situation events are monitored by a monitoring system from which a probe feeds one or more event alerts, and wherein the situation events include an indication of one or more relations between one or more of the virtual machines, one or more of the host devices, and one or more of the host fault events;
   identify one or more selected fault events from the plurality of fault events, wherein the selected fault events affect both one or more of the virtual machines and one or more of the host devices; and
   in response to the identifying, correlate one or more of the selected fault events as relating to a same problem.

11. The computer software product as claimed in claim 10, wherein the computer-executable instructions, when executed by the computer, further perform the following:
   inserting the plurality of fault events into a table of fault events.

12. The computer software product as claimed in claim 11, wherein one or more host machine fault events correlated to the same problem are marked as a root event in the table of fault events.

13. The computer software product as claimed in claim 12, wherein one or more virtual machine fault events correlated to the same problem are marked as symptoms in the table of fault events and a link to the root event is added in the table of fault events.

14. The computer software product as claimed in claim 13, wherein the computer-executable instructions, when executed by the computer, further perform the following:
   moving a selected virtual machine to a new host machine;
   in response to the moving, locating one or more fault events for the virtual machine in the table of fault events; and
   in response to the locating, reducing a severity for the located fault events.

15. The computer software product as claimed in claim 14, further comprising removing a root link for the located fault events.

16. A system for fault management in virtual computing environments, comprising:
   a monitor of a plurality of fault events from a plurality of virtual machines and a plurality of physical host devices in a virtual computing environment, wherein each of the physical host devices includes one or more hardware processors;
   a monitor of a plurality of situation events in the virtual computing environment wherein each of the situation events corresponds to a virtual machine name and a host device name, wherein the situation events are monitored by a monitoring system from which a probe feeds one or more event alerts, and wherein the situation events include an indication of one or more relations between one or more of the virtual machines, one or more of the physical host devices, and one or more of the host fault events;
   a normalising component for identifying one or more selected fault events from the plurality of fault events, wherein the selected fault events affect both one or more of the virtual machines and one or more of the host devices; and
   a correlating component for correlating one or more of the selected fault events as relating to a same problem.

17. The system as claimed in claim 16, further comprising:
   a virtual machine status table and a mapping of virtual machine names and host device names.

18. The system as claimed in claim 16, further comprising:
   a table of fault events for maintaining a list of fault events relating to one or more of the virtual machines and one or more of the physical host devices.

19. The system as claimed in claim 18, further comprising a root event marker in the table of fault events, the root event marker indicating that one or more host machine faults are correlated to the same problem.

20. The system as claimed in claim 19, further comprising a symptom marker in the table of fault events, the symptom marker indicating that one or more virtual machine fault events are correlated to the same problem, and further including a link to the root event in the table of fault events.

21. The system as claimed in claim 20, further comprising a fault resolution component, wherein when a virtual machine is moved to a new host machine, the fault resolution component locates one or more fault events for the virtual machine in the table of fault events and reduces a severity for the located fault events.

22. The system as claimed in claim 16, wherein the monitor for situation events obtains the situation events from a virtual environment cluster control centre and wherein the monitor for situation events feeds one or more event alerts to the fault management system.

23. The system as claimed in claim 16, wherein the monitor for fault events are one or more probes running on the virtual machines.

24. The system as claimed in claim 16, wherein the monitor for fault events are one or more probes running on the host machines.

25. The system as claimed in claim 16, wherein the monitor for fault events in the host machines obtains the fault events from a virtual environment cluster control centre and feeds one or more event alerts to the fault management system.

* * * * *